US012763409B2

(12) United States Patent
Wu et al.

(10) Patent No.: US 12,763,409 B2
(45) Date of Patent: Oct. 13, 2026

(54) BATTERY PACK

(71) Applicant: Ningde Amperex Technology Limited, Ningde (CN)

(72) Inventors: Mingjie Wu, Dongguan (CN); Shen Hu, Dongguan (CN)

(73) Assignee: Ningde Amperex Technology Limited, Ningde (CN)

(*) Notice: Subject to any disclaimer, the term of this patent is extended or adjusted under 35 U.S.C. 154(b) by 809 days.

(21) Appl. No.: 18/067,348

(22) Filed: Dec. 16, 2022

(65) Prior Publication Data

US 2023/0117730 A1 Apr. 20, 2023

Related U.S. Application Data

(63) Continuation of application No. PCT/CN2020/096892, filed on Jun. 18, 2020.

(51) Int. Cl.

*H01M 50/172* (2021.01)
*H01M 50/287* (2021.01)
*H01M 50/516* (2021.01)

(52) U.S. Cl.

CPC ....... *H01M 50/172* (2021.01); *H01M 50/287* (2021.01); *H01M 50/516* (2021.01)

(58) Field of Classification Search

CPC . H01M 50/172; H01M 50/287; H01M 50/516
See application file for complete search history.

(56) References Cited

U.S. PATENT DOCUMENTS

| | | | | |
|---|---|---|---|---|
| 2006/0091849 A1* | 5/2006 | Huynh | H01M 50/183 | 320/112 |
| 2006/0127756 A1* | 6/2006 | Seo | H01M 50/119 | 429/61 |
| 2011/0159323 A1* | 6/2011 | Kim | H01M 50/581 | 29/878 |

FOREIGN PATENT DOCUMENTS

| | | |
|---|---|---|
| CN | 206497936 U | 9/2017 |
| CN | 207398245 U | 5/2018 |
| CN | 208128637 U | 11/2018 |
| CN | 209249637 U | 8/2019 |
| CN | 209401727 U | 9/2019 |
| CN | 110534678 A | 12/2019 |

(Continued)

OTHER PUBLICATIONS

International Search Report issued on Mar. 19, 2021 in corresponding International Patent Application No. PCT/CN2020/096892; 6 pages.

(Continued)

*Primary Examiner* — Kenneth J Douyette
(74) *Attorney, Agent, or Firm* — Maier & Maier, PLLC

(57) ABSTRACT

A battery pack including cells, a circuit board, a first adapter strip, and a second adapter strip. Each of the cells includes tabs. The first adapter strip is connected to the tabs of two adjacent cells by welding. The second adapter strip is welded to the circuit board and connected to the first adapter strip by welding. The battery pack implements electrical connection to the tabs of the cells through the first adapter strip, and is electrically connected to the first adapter strip and the circuit board separately through the second adapter strip, to electrically connect the cells to the circuit board. The circuit board directly collects information on the tabs of each cell, without requiring structures like copper bars, transfer circuit board, and flexible printed circuit board.

20 Claims, 13 Drawing Sheets

(56) References Cited

FOREIGN PATENT DOCUMENTS

| | | | |
|---|---|---|---|
| CN | 210467965 | U | 5/2020 |
| EP | 2187465 | A1 | 5/2010 |
| JP | 2010123299 | A | 6/2010 |
| JP | 2012099645 | A | 5/2012 |
| JP | 2013105700 | A | 5/2013 |
| JP | 2016539474 | A | 12/2016 |
| JP | 2017520095 | A | 7/2017 |
| JP | 6245460 | B1 | 12/2017 |
| JP | 2019106253 | A | 6/2019 |

OTHER PUBLICATIONS

Office Action issued on Apr. 24, 2024, in corresponding Japanese Application No. 2022-577781, 6 pages.
Extended Search Report issued on Jan. 16, 2024, in corresponding European Application No. 20941086.9, 3 pages.

* cited by examiner

BATTERY PACK

CROSS REFERENCE TO THE RELATED APPLICATIONS

The present application is a continuation application of PCT application PCT/CN2020/096892, filed on 18 Jun. 2020, which is hereby incorporated by reference in its entirety.

TECHNICAL FIELD

This application relates to a battery pack.

BACKGROUND

In existing battery packs, electrical connection is usually implemented between battery units and information such as voltage of the battery units is usually collected by using a cable, a transfer circuit board, a copper bar, a flexible printed circuit board (FPC, FLEXIBLE PRINTED CIRCUIT), or the like. For example, tabs and a copper bar on a cell in a pouch-type battery pack are welded onto the transfer circuit board concurrently. The transfer circuit board is then electrically connected to a battery management system (BMS, BATTERY MANAGEMENT SYSTEM) circuit board of the battery pack by a wire harness or a connector or the like. The use of the cable, the copper bar, the transfer circuit board, the FPC, or the like involves screw fastening, cable fixing, insulation, FPC protection, connector model selection, and other issues. The existing battery pack solutions require a high cost, a large space, a large number of parts, and a complicated manufacturing process, and are scarcely automated and not easy to standardize.

SUMMARY

In view of the foregoing situation, it is necessary to provide a battery pack that omits a transfer structure such as a copper bar and that simplifies a structure for collecting information such as voltage.

This application provides a battery pack. The battery pack includes at least two cells, one circuit board, a first adapter strip, and a second adapter strip. Each of the cells includes tabs. The first adapter strip is connected to the tabs of two adjacent cells by welding. The second adapter strip is welded to the circuit board and connected to the first adapter strip by welding.

According to some embodiments of this application, the circuit board is provided with a first via hole. A contact interface between the first adapter strip and the second adapter strip is disposed in the first via hole.

According to some embodiments of this application, the first adapter strip includes a first fixing portion, a first bend portion, and a first connecting portion connected in tandem. The first fixing portion is welded to the tabs of the two adjacent cells. The first connecting portion is configured to be welded to the second adapter strip. The first connecting portion is disposed in the first via hole.

According to some embodiments of this application, the first bend portion is at least partly disposed in the first via hole.

According to some embodiments of this application, the second adapter strip includes a second fixing portion, a second bend portion, and a second connecting portion connected in tandem. The second fixing portion is welded to the circuit board. The second connecting portion is configured to be welded to the first adapter strip. The second connecting portion is disposed in the first via hole.

According to some embodiments of this application, the second bend portion is at least partly disposed in the first via hole.

According to some embodiments of this application, the circuit board includes a first surface and a second surface opposite to the first surface. The first surface faces the cell, and the second fixing portion is disposed on the second surface.

According to some embodiments of this application, the circuit board is provided with a second via hole. The second via hole communicates with the first via hole, and the first fixing portion is at least partly exposed in the second via hole.

According to some embodiments of this application, a positive tab and a negative tab are disposed at one side of the cell. The first adapter strip is electrically connected to positive tabs and negative tabs of the two adjacent cells.

According to some embodiments of this application, the circuit board is provided with a third via hole. The battery pack further includes a third adapter strip. The third adapter strip is disposed on a side that is of circuit board and that faces back from the cell. A positive tab or negative tab of an outside cell passes through the third via hole and is connected to the third adapter strip.

According to some embodiments of this application, the circuit board is provided with a fourth via hole. The fourth via hole partly overlaps a projection of the third adapter strip on the circuit board.

According to some embodiments of this application, the circuit board includes a first surface and a second surface opposite to the first surface. The first surface faces the cell. The circuit board is provided with a first via hole. A contact interface between the first adapter strip and the second adapter strip is disposed outside the first via hole.

According to some embodiments of this application, the second adapter strip is disposed on the first surface.

According to some embodiments of this application, the second adapter strip is disposed on the second surface. The first adapter strip includes a first fixing portion, a first bend portion, and a first connecting portion connected in tandem. The first fixing portion is welded to the tabs of the two adjacent cells. The first connecting portion is configured to be welded to the second adapter strip. The first bend portion is at least partly disposed in the first via hole.

According to some embodiments of this application, the circuit board is a circuit board that is provided with a battery management system (BMS, BATTERY MANAGEMENT SYSTEM).

The foregoing battery pack implements electrical connection to the tabs of the cells through the first adapter strip, and is electrically connected to the first adapter strip and the circuit board through the second adapter strip, so that the cells are electrically connected to the circuit board. The circuit board can collect information such as voltage and temperature of the cells through the first adapter strip and the second adapter strip. Further, the circuit board is a circuit board that is provided with a battery management system (BMS, BATTERY MANAGEMENT SYSTEM). The battery pack omits structures such as copper bar, transfer circuit board, and flexible printed circuit board required in the prior art, thereby reducing cost, simplifying the structure, and facilitating installation.

REFERENCE NUMERALS

Figure 1:
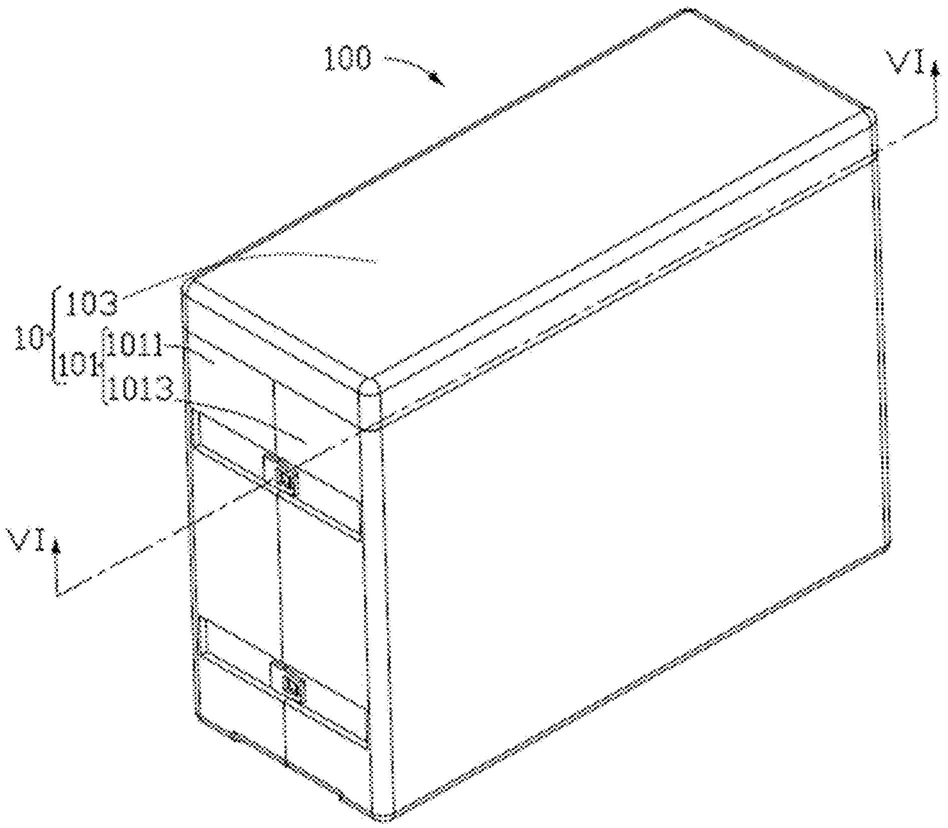
FIG. 1 is a schematic structural diagram of a battery pack according to a first embodiment of this application.

Battery pack 100, **100*a*, 100*b*, 100*c***
Shell 10, **10*c***
First positioning structure 1001, **1001*b***
Second positioning structure 1003, **1003*b***
Housing structure 101
First housing 1011
Second housing 1013
Abutting wall 1015
Outer cover 103, **103*b***
Positioning pin 11
First buckle 13
Main body 131
Second abutting surface 1311
First snap-fit portion 133
Guiding surface 1331
First abutting surface 1333
Second buckle **13*a***
Second snap-fit portion **133*a***
Prop portion 14, 16
Second slot 15
Hold-down portion 17
Third buckle 18
Abutting portion 181
Pillar 19
First lateral shell 104
Second lateral shell 105
Battery cell 20
First end 201
Second end 203
Cell body 21
Positive tab 23
Negative tab 25
Circuit board 30
First surface 301
Second surface 303
First via hole 31
Second via hole 33
Third via hole 34
Fourth via hole 35
Third positioning structure 3001, **3001*b***
Fourth positioning structure 3003
Positioning hole 36
Avoidance hole 37
First slot 38
First sidewall 381
Second sidewall 383
Third sidewall 385
Third slot 39
First adapter strip 40, **40*a***
First fixing portion 41
First bend portion 43
First connecting portion 45
Second adapter strip 50, **50*a***
Second fixing portion 51
Second bend portion 53
Second connecting portion 55
Third adapter strip 60
First direction Z
Second direction X
Third direction Y This application is further described below with reference to the following specific some embodiments and the foregoing drawings.

DETAILED DESCRIPTION

The following describes the technical solutions in some embodiments of this application with reference to the drawings hereof. Evidently, the described some embodiments are merely a part of but not all of the embodiments of this application.

Unless otherwise defined, all technical and scientific terms used herein have the same meanings as usually understood by a person skilled in the technical field of this application. The terms used in the specification of this application herein are merely intended for describing specific some embodiments but are not intended to limit this application.

Some embodiments of this application disclose a battery pack. The battery pack includes at least two cells, one circuit board, a first adapter strip, and a second adapter strip. Each of the cells includes tabs. The first adapter strip is connected to the tabs of two adjacent cells by welding. The second adapter strip is welded to the circuit board and connected to the first adapter strip by welding.

The foregoing battery pack implements electrical connection to the tabs of the cells through the first adapter strip, and is electrically connected to the first adapter strip and the circuit board through the second adapter strip, so that the cells are electrically connected to the circuit board. The circuit board can collect information such as tab voltage of the cells through the first adapter strip and the second adapter strip. The battery pack omits structures such as copper bar, transfer circuit board, and flexible printed circuit board required in the prior art, thereby reducing cost, simplifying the structure, and facilitating installation.

The following describes some embodiments of this application in detail with reference to drawings. To the extent that no conflict occurs, the following some embodiments and the features in some embodiments may be combined with each other.

First Embodiment

Figure 2:
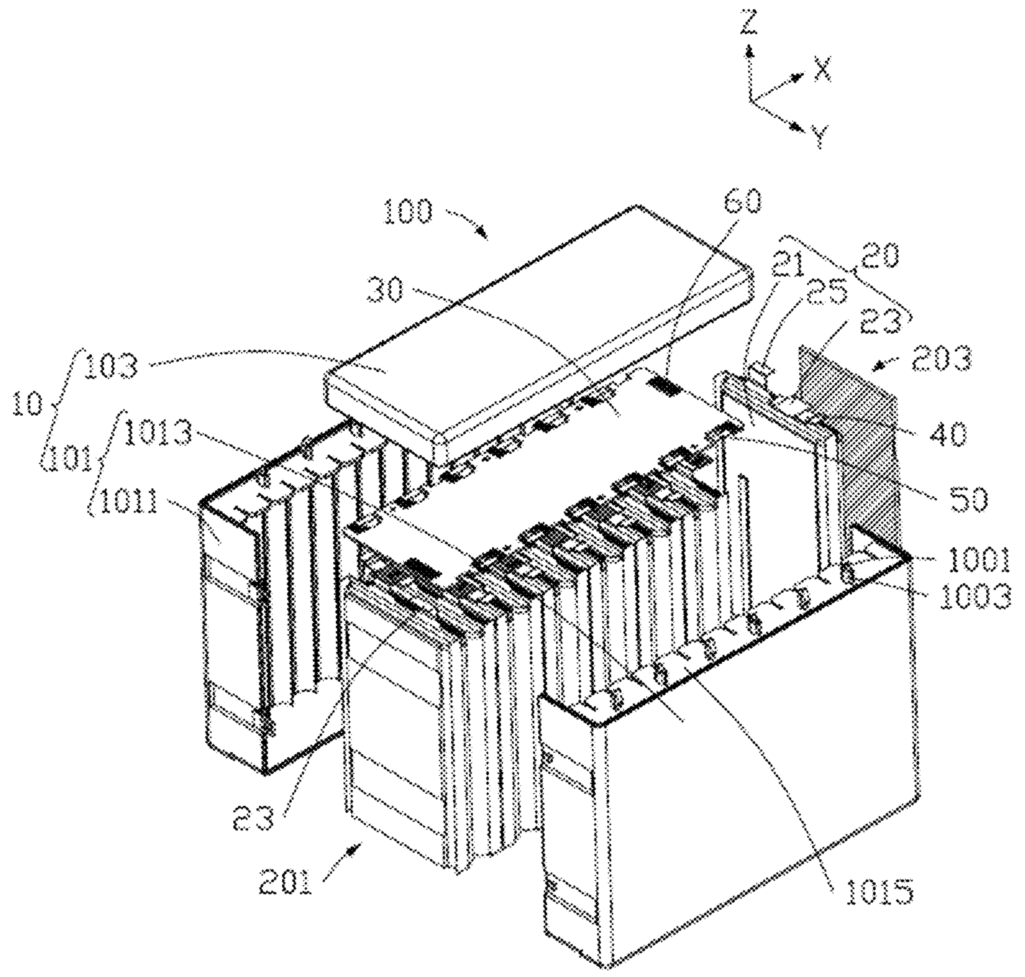
FIG. 2 is a schematic exploded view of a structure of the battery pack shown in FIG. 1.
Figure 3:
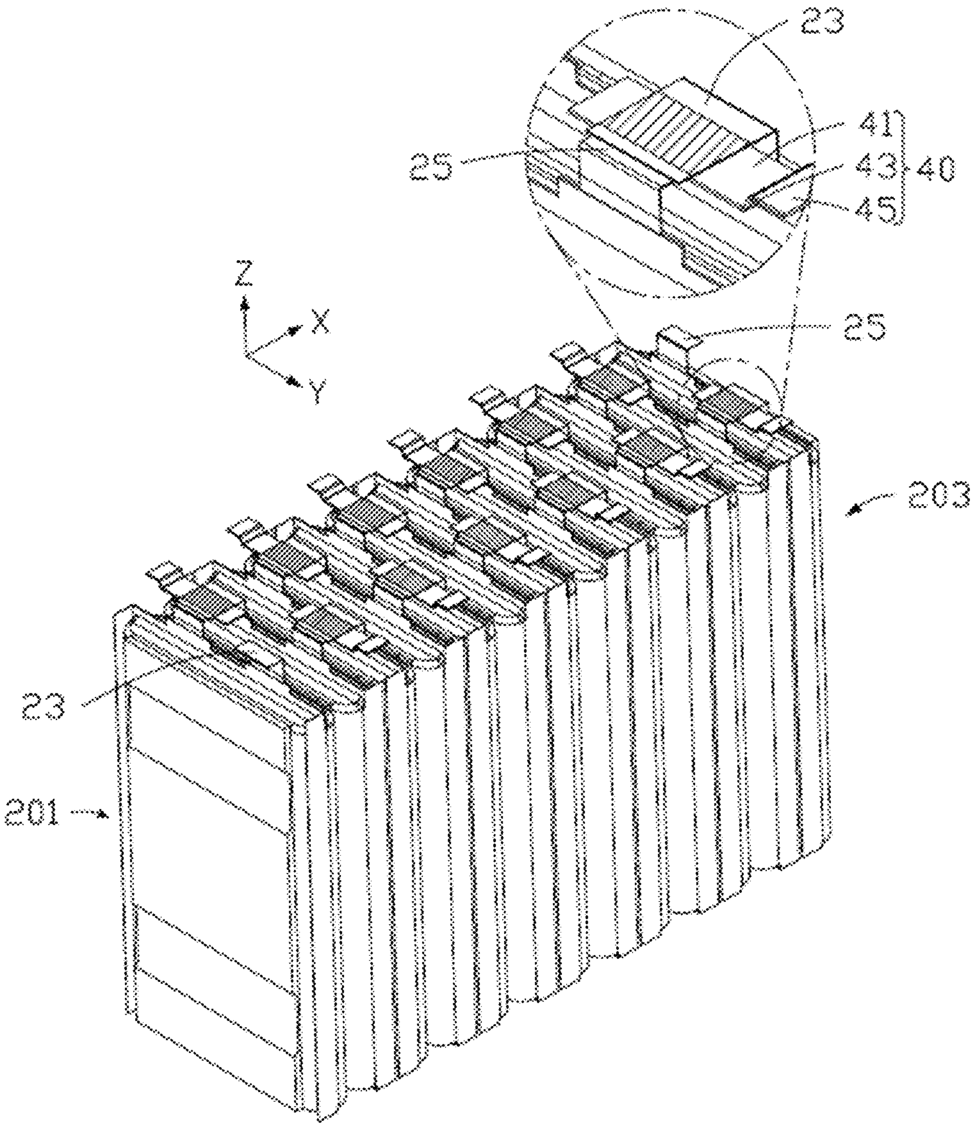
FIG. 3 is a schematic structural diagram after cells and a first adapter strip are assembled in the battery pack shown in FIG. 1.

Referring to FIG. 1 to FIG. 3 concurrently, an embodiment of this application provides a battery pack 100. The battery pack 100 includes a shell 10, cells 20, and a circuit board 30. The cells 20 and the circuit board 30 are located in the shell 10. The shell 10 is configured to fix the cells 20 and the circuit board 30. The circuit board 30 is provided with a battery management system.

Each of the cells 20 includes a cell body 21 and two tabs. The two tabs are a positive tab 23 and a negative tab 25 respectively. The positive tab 23 and the negative tab 25 are disposed at one side of the cell body 21, and extend out of the cell body 21. The number of the cells 20 is plural, and may be but is not limited to 13, for example. A plurality of cells 20 are arranged in the shell 10 in sequence.

For ease of description below, as shown in FIG. 2, a first direction Z, a second direction X, and a third direction Y are defined based on coordinate axes. In this embodiment, the first direction Z is parallel to a direction in which the positive tab 23 or the negative tab 25 extends from the cell body 21. The second direction X is parallel to an arrangement direction of the plurality of cells 20. The third direction Y is perpendicular to the first direction Z and the second direction X.

The plurality of the cells 20 are electrically connected in series. Specifically, of the two adjacent cells 20, a positive tab 23 of one cell 20 and a negative tab 25 of another cell 20 are bent, and then extend toward each other along the second direction X, and are stacked together. Along the second direction X, the plurality of arranged cells 20 include a first end 201 and a second end 203. The positive tab 23 of a cell 20 located at the first end 201 and the negative tab 25 of a cell 20 located at the second end 203 extend back from each other along the second direction X, and serve as a positive electrode and a negative electrode of the plurality of the cells 20 respectively. Understandably, in other embodiments, the plurality of cells 20 may also be electrically connected in parallel.

Figure 4:
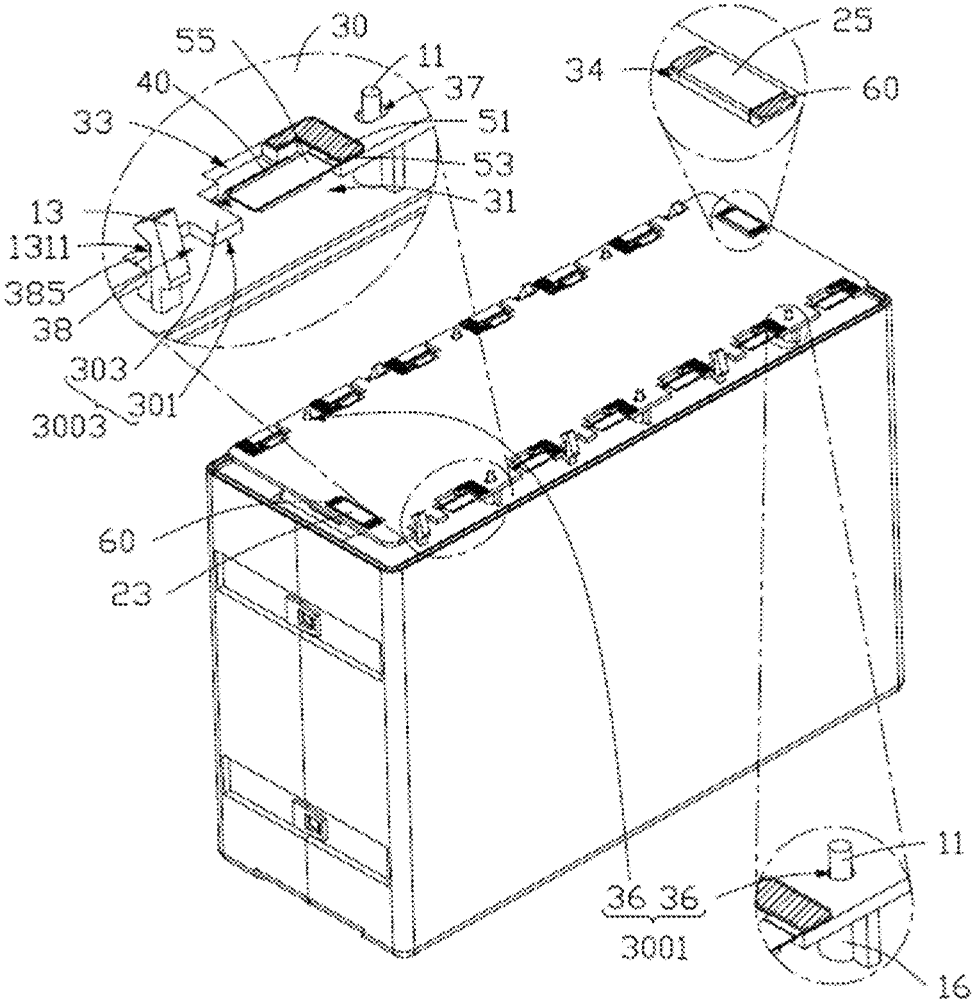
FIG. 4 is a schematic structural diagram of the battery pack shown in FIG. 1 without an outer cover.
Figure 5:
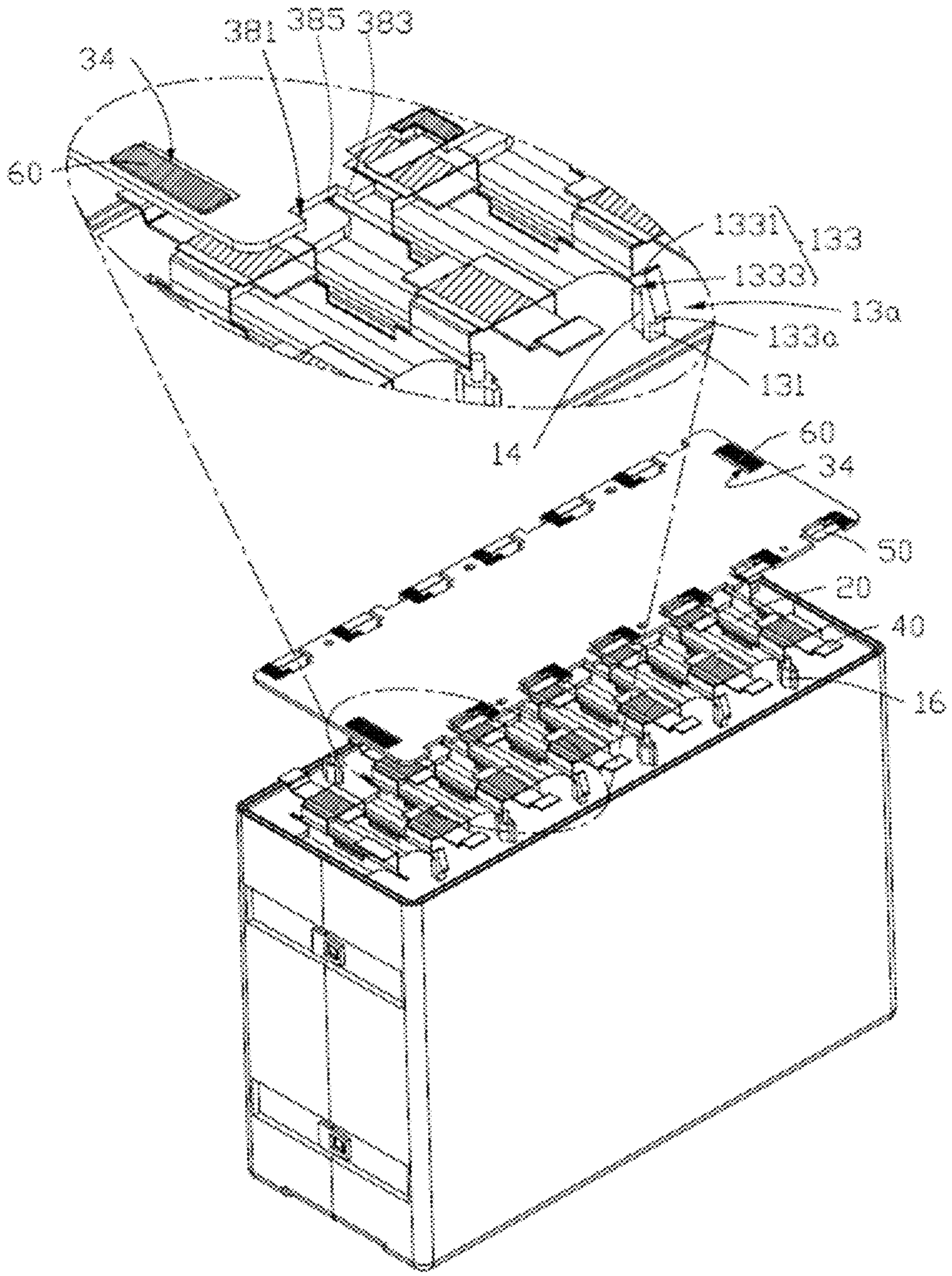
FIG. 5 is a schematic exploded view of a structure of the battery pack shown in FIG. 4.

Still referring to FIG. 3, FIG. 4, and FIG. 5, the battery pack 100 further includes a first adapter strip 40 and a second adapter strip 50. The first adapter strip 40 is electrically connected to the positive tabs 23 and the negative tabs 25 of the two adjacent cells 20. Specifically, the first adapter strip 40, the negative tab 25, and the positive tab 23 are stacked in sequence along the first direction Z, but the arrangement manner is not limited to the example given here. The first adapter strip 40, the positive tab 23, and the negative tab 25 are connected by ultrasonic welding or laser welding, thereby implementing electrical connection, where the weld region is the shaded region shown in FIG. 3.

The first adapter strip 40 and the negative tab 25 are made of a copper material, and the positive tab 23 is made of an aluminum material, but the materials are not limited to the materials exemplified herein. In the first direction Z, the first adapter strip 40 and the negative tab 25 that are made of a copper material are placed under the positive tab 23 made of an aluminum material. The melting point of copper is higher than that of aluminum. During welding, the welding energy increases when the welding comes to a lower position, thereby increasing the welding effect.

Understandably, in other embodiments, the stacking sequence of the first adapter strip 40, the negative tab 25, and the positive tab 23 may vary. For example, the first adapter strip 40 may also be located above the negative tab 25, and the stacking order of the negative tab 25 and the positive tab 23 may be set depending on the material.

The positive tabs 23, the negative tabs 25, and the first adapter strips 40 on the plurality of cells 20 may be welded concurrently by using an apparatus such as a mold, so as to improve the efficiency of assembling the cells.

The second adapter strip 50 is disposed on the circuit board 30. The second adapter strip 50 is electrically connected to the circuit board 30 and the first adapter strip 40. The circuit board 30 is provided with a first via hole 31. The first via hole 31 runs through a lateral side of the circuit board 30, but this application is not limited thereto. A part of the first adapter strip 40 and a part of the second adapter strip 50 are exposed in the first via hole 31, and projections of the two parts along the first direction Z partly overlap. The first adapter strip 40 and the second adapter strip 50 are ultrasonically welded or laser-welded through the first via hole 31 by using a welding apparatus (not shown in the drawing).

A contact interface between the first adapter strip 40 and the second adapter strip 50 is located in, but without limitation, the first via hole 31. Specifically, the second adapter strip 50 extends to the first via hole 31. The second adapter strip 50 is connected onto the circuit board 30 by means of surface mount technology (SMT, SURFACE MOUNT TECHNOLOGY), and extends along the second direction X, where a connection region between the second adapter strip 50 and the circuit board 30 is the shaded region shown in FIG. 4. The first adapter strip 40 extends to the first via hole 31 along the third direction Y so as to be connected to the second adapter strip 50.

The second adapter strip 50 includes a second fixing portion 51, a second bend portion 53, and a second connecting portion 55 that are connected in tandem. The second fixing portion 51 is connected onto the circuit board 30. The second connecting portion 55 is connected to the first adapter strip 40. The second bend portion 53 tilts against the second fixing portion 51 and the second connecting portion 55 separately, so that a bend structure is formed on the second adapter strip 50.

The second fixing portion 51 is located on a side that is of the circuit board 30 and that facing away from the cell 20. The circuit board 30 includes a first surface 301 and a second surface 303 opposite to the first surface 301. The first surface 301 faces the cell 20. The second fixing portion 51 is disposed on the second surface 303. During welding, in order to implement firm welding between the second connecting portion 55 and the first adapter strip 40, the second adapter strip 50 is deformable so that the second connecting portion 55 extends in a direction approaching the first adapter strip 40. For example, an angle between the second bend portion 53 and the second fixing portion 51 changes, the second bend portion 53 deforms by itself, or an angle between the second bend portion 53 and the second connecting portion 55 changes, or the like. Even if the first adapter strip 40 deforms when being welded to the positive tab 23 and the negative tab 25, or a manufacturing error or an installation error occurs in the structure in the battery pack 100, the second adapter strip 50 can still be firmly welded to the first adapter strip 40 through the second bend portion 53 that forms the bend structure on the second adapter strip 50. Understandably, in other embodiments, the second fixing portion 51 may be located on a side that is of the circuit board 30 and that faces the cell 20.

The second fixing portion 51 is parallel to, but without limitation, the second connecting portion 55. In other embodiments, the second fixing portion 51 may be not parallel to the second connecting portion 55 as long as the second connecting portion 55 can be connected to the first adapter strip 40.

Referring to FIG. 3 and FIG. 4 concurrently, the first adapter strip 40 includes a first fixing portion 41, a first bend portion 43, and a first connecting portion 45 that are connected in tandem. The first fixing portion 41 is connected to the positive tab 23 and the negative tab 25. The first connecting portion 45 contacts the second connecting portion 55 connected to the second adapter strip 50. The first bend portion 43 tilts against the first fixing portion 41 and the first connecting portion 45 separately, so that a bend structure is formed on the first adapter strip 40. In this way, the first adapter strip 40 is easily deformable, and the first connecting portion 45 extends in a direction approaching the second adapter strip 50, so as to improve the welding effect between the first adapter strip 40 and the second adapter strip 50.

A bend structure is disposed on both the first adapter strip 40 and the second adapter strip 50, thereby improving the anti-vibration effect of the battery pack 100 and increasing reliability of the connection between the first adapter strip 40 and the positive tab 23 and the negative tab 25, and the connection between the first adapter strip 40 and the second adapter strip 50.

The second bend portion 53 and the first bend portion 43 are at least partly located in, but without limitation, the first via hole 31 separately. The first via hole 31 provides a space that allows the second adapter strip 50 and the first adapter strip 40 to extend after deforming.

Understandably, in other embodiments, the first adapter strip 40 and/or the second adapter strip 50 may omit the bend structure.

Understandably, the first adapter strip 40 and the second adapter strip 50 may extend separately, so that the contact interface between the two adapter strips is located outside the first via hole 31. For example, in another embodiment, the contact interface between the first adapter strip 40 and the second adapter strip 50 is located in a space between the circuit board 30 and the cell body 21. In this space, the contact interface between the two adapter strips is welded and fixed through the first via hole 31 by using a welding apparatus. For another example, in another embodiment, the second fixing portion 51 of the second adapter strip 50 is disposed on the second surface 303. The contact interface between the first adapter strip 40 and the second adapter strip 50 is located on a side that is of the first via hole 31 and that facing away from the cell 20. The first fixing portion 41 of the first adapter strip 40 is welded to the tabs of the two adjacent cells 20, and is located on a side that is of the circuit board 30 and that faces the cell 20. The first bend portion 43 is at least partly disposed in the first via hole 31. A surface that is of the first connecting portion 45 and that faces the first surface 301 is connected to the second connecting portion 55 by welding. The surface that is of the first connecting portion 45 and that faces the first surface 301 is flush with or higher than the top that is of the first via hole 31 and that facing away from the cell 20. That is, the contact interface between the first connecting portion 45 and the second connecting portion 55 is located outside the first via hole 31.

The circuit board 30 is provided with a second via hole 33. The first fixing portion 41 is at least partly exposed in the second via hole 33 to expose a joint of electrical connection between the first adapter strip 40 and the positive tab 23 and the negative tab 25, the electrical connection being located on the first adapter strip. The second via hole 33 allows passage of a probe (not shown in the drawing) configured to test an internal resistance. The probe can abut against the joint between the first adapter strip 40 and the positive tab 23 and the negative tab 25 to implement the internal resistance test, the joint being located on the first adapter strip. Understandably, in other embodiments, the second via hole 33 may be omitted, and the internal resistance test may be performed by other means.

A plurality of first via holes 31 are opened on two sides of the circuit board 30 separately, and run through a lateral side of the circuit board 30, but this application is not limited thereto. The second via hole 33 communicates with the first via hole 31. Understandably, in other embodiments, the position of the first via hole 31 on the circuit board 30 may be determined based on the positions of the positive tab 23 and the negative tab 25 on the cell 20, without letting the first via hole 31 run through the lateral side of the circuit board 30. The second via hole 33 may be configured not to communicate with the first via hole 31.

Referring to FIG. 4 and FIG. 5 concurrently, the battery pack 100 further includes a third adapter strip 60. The third adapter strip 60 is disposed on the circuit board 30. Specifically, the third adapter strip 60 is connected, by means of a surface mount technology, to a side that is of the circuit board 30 and that facing away from the cell 20. That is, the third adapter strip 60 is connected to the second surface 303 of the circuit board 30.

The number of the third adapter strips 60 is two. One of the third adapter strips 60 is electrically connected to the positive tab 23 of the cell 20 located at the first end 201. The other third adapter strip 60 is electrically connected to the negative tab 25 of the cell 20 located at the second end 203. A third via hole 34 is opened on a side of the circuit board 30, the side on which the third adapter strip 60 is located. The positive tab 23 and the negative tab 25 pass through the corresponding third via hole 34 separately, and are connected to the third adapter strip 60 separately by ultrasonic welding or laser welding.

Figure 6:
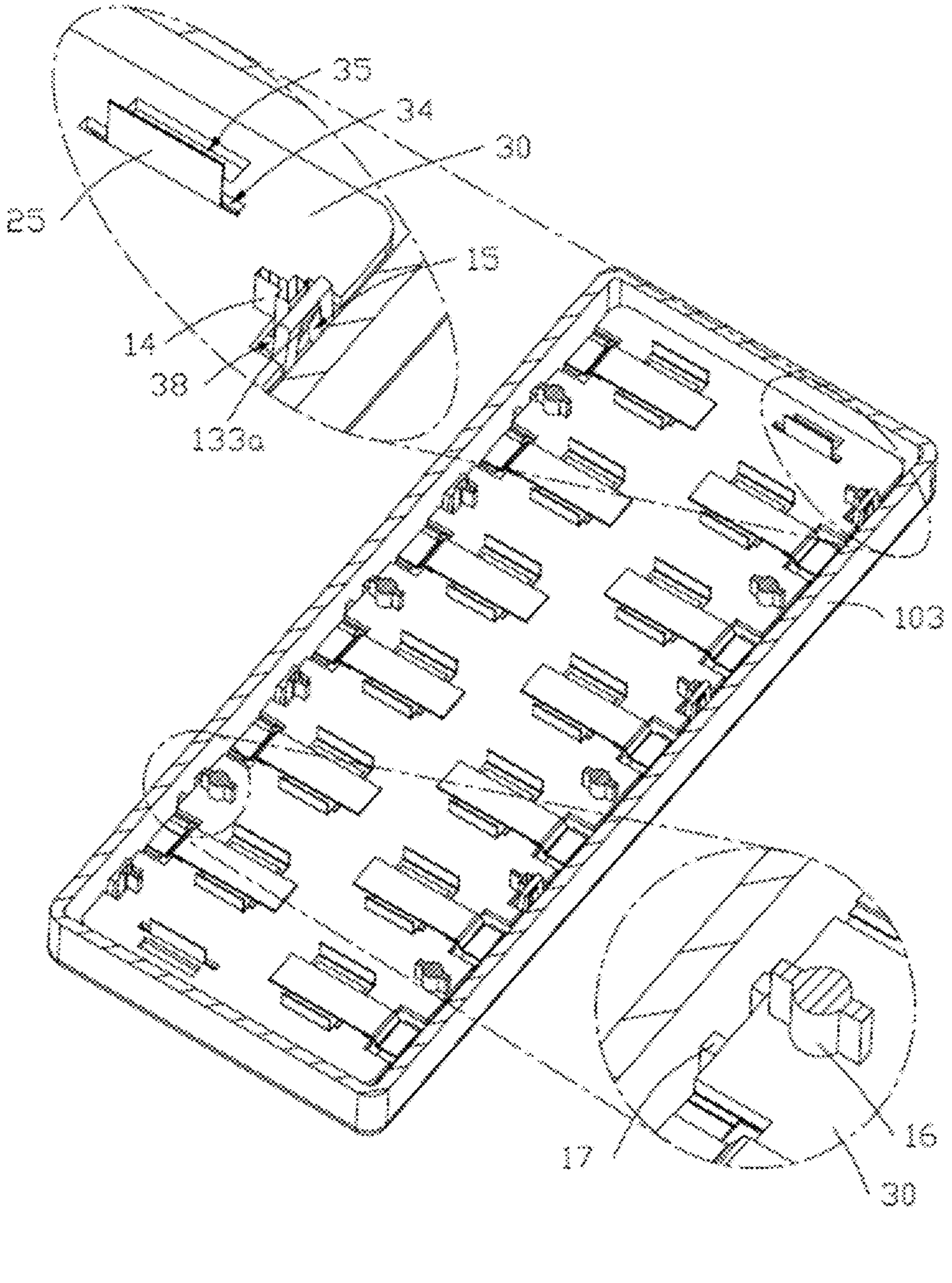
FIG. 6 is a structural sectional view of the battery pack shown in FIG. 1 sectioned along an IV-VI line.

Referring to FIG. 6, a fourth via hole 35 is opened on the circuit board 30. A projection of the fourth via hole 35 partly overlaps a projection of the third adapter strip 60 on the circuit board 30. Heat generated by the third adapter strip 60 during welding is expelled through the fourth via hole 35. Understandably, in other embodiments, the fourth via hole 35 is omissible.

During assembling, the second adapter strip 50 and the third adapter strip 60 are connected onto the circuit board 30 separately. The first adapter strip 40 is welded to the positive tab 23 and the negative tab 25 to implement connection. Then, the first adapter strip 40 is welded to the second adapter strip 50, and the third adapter strip 60 is welded to the positive tab 23 and the negative tab 25 separately. With the welding performed twice consecutively, no via hole needs to be opened on the circuit board 30 for a purpose of welding the first adapter strip 40 to the positive tab 23 and the negative tab 25, thereby improving the effective use area of the circuit board 30 and increasing the layout space on the circuit board 30. Understandably, in other embodiments, a via hole may be added on the circuit board 30, so that the two welding operations are combined into one welding operation performed at a time.

Figure 8:
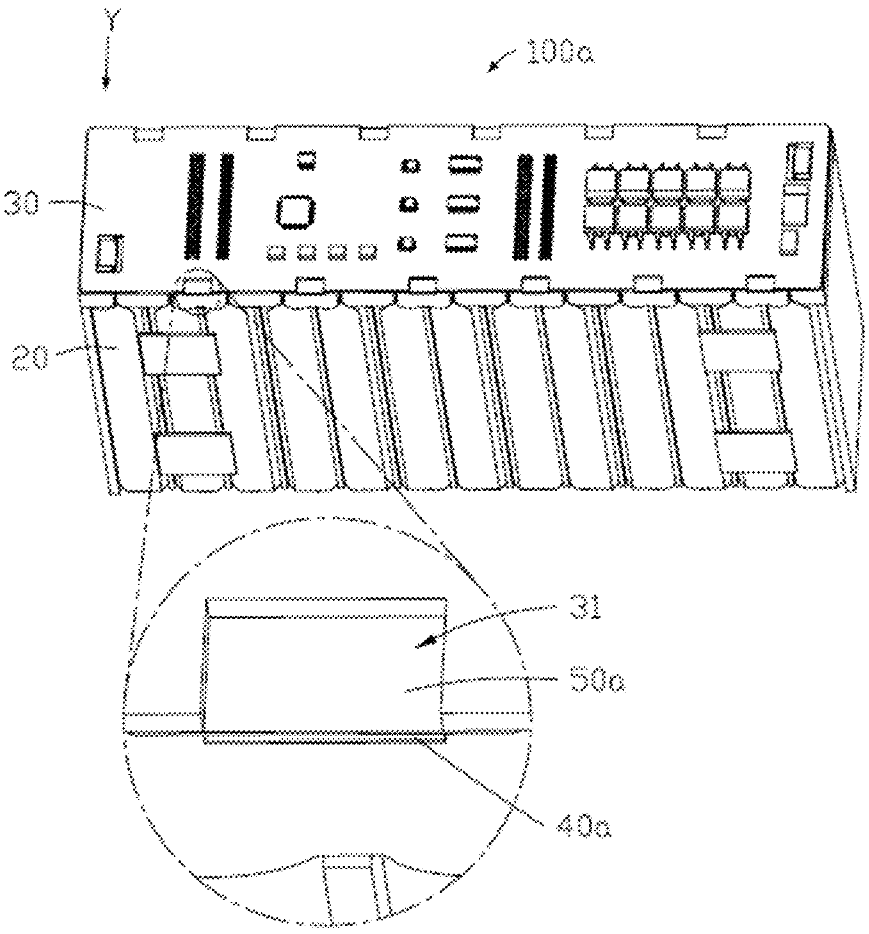
FIG. 8 is a schematic structural diagram of cells, a first adapter strip, a second adapter strip, and a circuit board in the battery pack shown in FIG. 1 according to another embodiment.
Figure 9:
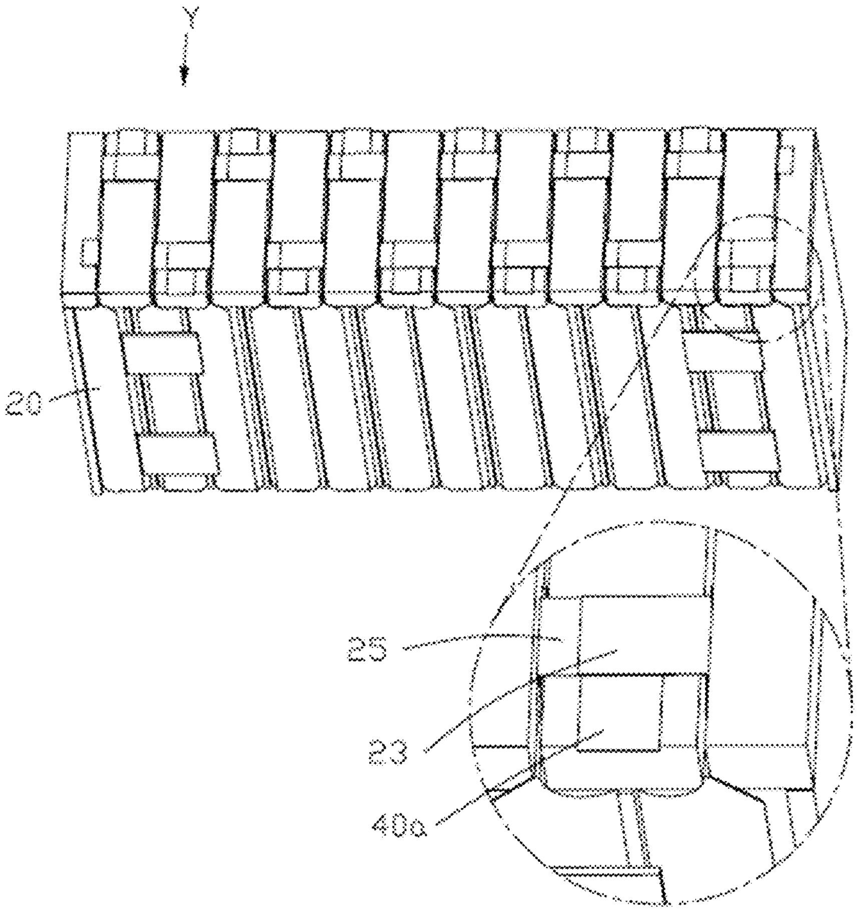
FIG. 9 is a schematic structural diagram after cells and a first adapter strip are assembled in the battery pack shown in FIG. 8.

Referring to FIG. 8 and FIG. 9 concurrently, in another embodiment, the structure of the battery pack **100*a* is approximately the same as the structure of the battery pack 100, but differs in the structure of the first adapter strip 40*a* and the second adapter strip 50*a* of the battery pack 100*a*. Specifically, the structure of both the first adapter strip 40*a* and the second adapter strip 50*a* is a planar sheet structure. The second adapter strip 50*a* is disposed on the first surface 301 of the circuit board 30. Both the first adapter strip 40*a*** and the second adapter strip 50*a* extend along the third direction Y toward the first via hole 31 on the circuit board 30. A contact interface between the first adapter strip 40*a* and the second adapter strip 50*a* is disposed outside the first via hole 31. The first adapter strip 40*a* and the second adapter strip 50*a* are welded through the first via hole 31 by using a welding apparatus.

Understandably, in other embodiments, the contact interface between the first adapter strip 40*a* and the second adapter strip 50*a* may be disposed in the first via hole 31. For example, a via hole is opened on the circuit board 30, and a bend structure is disposed on the first adapter strip 40*a*. In this way, the first adapter strip 40*a* extends into the first via hole 31 to contact and connect to the second adapter strip 50*a* in the first via hole 31.

Referring to FIG. 2 and FIG. 4 concurrently, the circuit board 30 is connected inside the shell 10 in a snap-fit manner. The battery pack 100 further includes a first positioning structure 1001 and a second positioning structure 1003 that are disposed on an inner wall of the shell 10, and includes a third positioning structure 3001 and a fourth positioning structure 3003 that are disposed on the circuit board 30. The first positioning structure 1001 coordinates with the third positioning structure 3001 so that the circuit board 30 is positioned in a plane (not shown in the drawing). The plane is any plane perpendicular to the first direction Z. The plane is parallel to the circuit board 30. The second positioning structure 1003 coordinates with the fourth positioning structure 3003 so that the circuit board 30 is positioned in the first direction Z. The shell 10 implements the positioning of the circuit board 30 in the first direction Z, the second direction X, and the third direction Y, so that the circuit board 30 is fixed onto the shell 10.

The shell 10 includes a housing structure 101 and an outer cover 103 disposed on one side of the housing structure 101. The cell 20 is placed in the housing structure 101. The outer cover 103 is located on a side that is of the circuit board 30 and that facing away from the cell 20. The first positioning structure 1001 is disposed on the housing structure 101. The second positioning structure 1003 is disposed on the housing structure 101 and/or the outer cover 103.

The housing structure 101 includes a first housing 1011 and a second housing 1013. The first housing 1011 and the second housing 1013 move toward each other from two sides of the cell 20 respectively and are connected and fixed in a snap-fit manner. Two abutting walls 1015 are disposed on the first housing 1011 and the second housing 1013 respectively along the first direction Z, and are spaced apart. When the first housing 1011 is snap-fitted and fixed to the second housing 1013, the two abutting walls 1015 abut against two sides of the cell body 21 of the cell 20 respectively, so that the housing structure 101 clamps and fixes the plurality of the cells 20.

The first positioning structure 1001 and the second positioning structure 1003 are symmetrically disposed on, but without limitation, the first housing 1011 and the second housing 1013 respectively.

The first positioning structure 1001 includes two positioning pins 11 that are spaced apart on the housing structure 101. The third positioning structure 3001 includes positioning holes 36 that are spaced apart on the circuit board 30. Each of the positioning pins 11 is inserted into a corresponding positioning hole 36 to limit movement of the circuit board 30 in the plane. The circuit board 30 is positioned in the second direction X and the third direction Y.

Among the two positioning pins 11, one positioning pin 11 is disposed on the first housing 1011, and the other positioning pin 11 is disposed on the second housing 1013. The two positioning pins 11 are centrosymmetrically arranged in, but without limitation, a plane parallel to the circuit board 30. Understandably, in other embodiments, the two positioning pins 11 may be spaced apart on the first housing 1011, or spaced apart on the second housing 1013.

Referring to FIG. 4 and FIG. 5 concurrently, the second positioning structure 1003 includes a first buckle 13 and a prop portion 14. The first buckle 13 includes a main body 131 and a first snap-fit portion 133. The main body 131 is disposed on the housing structure 101 and is located on one side of the circuit board 30. The first snap-fit portion 133 is disposed on a side that is of the main body 131 and that faces the circuit board 30. The prop portion 14 is disposed on the housing structure 101. The fourth positioning structure 3003 includes a first surface 301 and a second surface 303 that are disposed on two opposite sides of the circuit board 30. The first surface 301 faces the cell 20. The prop portion 14 is opposite to the first snap-fit portion 133. The prop portion 14 abuts against the first surface 301. The first snap-fit portion 133 abuts against the second surface 303 to limit movement of the circuit board 30 in the first direction Z and position the circuit board 30 in the first direction Z. The prop portion 14 props the circuit board 30, and can allow for a space for electrical connection between the cell 20 and the circuit board 30.

The number of the first buckles 13 is plural. For example, the number of the first buckles 13 is six. The plurality of first buckles 13 are separately disposed on two sides of the circuit board 30, and are symmetrically disposed on the first housing 1011 and the second housing 1013.

The first snap-fit portion 133 is provided with a guiding surface 1331 and a first abutting surface 1333. The main body 131 is elastically deformable. The first abutting surface 1333 is spaced apart from and opposite to the prop portion 14. The guiding surface 1331 is configured to guide sliding of the circuit board 30 to a position between the first abutting surface 1333 and the prop portion 14. When the circuit board 30 moves toward the housing structure 101 along the first direction Z, the circuit board 30 abuts on the guiding surface 1331, and drives the main body 131 to deform, so that the circuit board 30 is positioned between the prop portion 14 and the first abutting surface 1333.

The first buckle 13 is further provided with a second abutting surface 1311. Specifically, the second abutting surface 1311 is disposed on a side that is of the main body 131 and that faces the circuit board 30. The third positioning structure 3001 further includes a first wall and a second wall that are disposed on two opposite sides of the circuit board 30. The two second abutting surfaces 1311 located on two sides of the circuit board 30 abut against the first wall and the second wall respectively. In this way, the two first buckles 13 located on the two sides of the circuit board 30 clamp and fix the circuit board 30, so as to improve strength of connection between the circuit board 30 and the housing structure 101. Understandably, in other embodiments, the second abutting surfaces 1311 are omissible.

A plurality of first slots 38 are opened on the two sides of the circuit board 30. The first slot 38 includes a first sidewall 381, a second sidewall 383, and a third sidewall 385. The first sidewall 381 and the second sidewall 383 are disposed toward each other at two ends of the third sidewall 385. The first wall and the second wall are the two third sidewalls 385 of the two first slots 38 at the two sides of the circuit board 30 respectively. The second abutting surfaces 1311 abut against the third sidewall 385.

The first buckle 13 is located in the first slot 38, thereby increasing the area available for arranging electronic components on the circuit board 30. Minimum distances from the first sidewall 381 and the second sidewall 383 to the first buckle 13 are greater than zero, thereby enabling the first buckle 13 to move in the first slot 38 and avoiding the problem of interference between the first buckle 13 and the circuit board 30 caused by factors such as a manufacturing error. Understandably, in other embodiments, the first slot 38 is omissible, and the first buckle 13 may directly hold down on the two sides of the circuit board 30.

Figure 7:
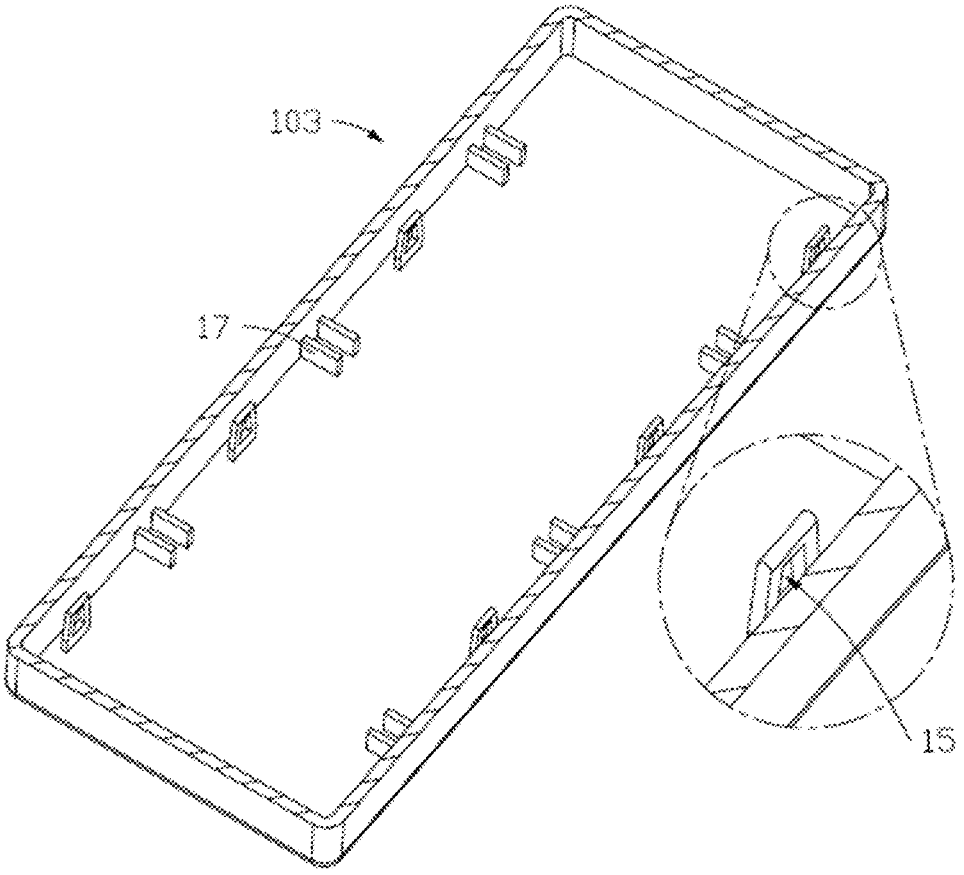
FIG. 7 is a schematic structural diagram of an outer cover of the battery pack shown in FIG. 6.

Still referring to FIG. 6 and FIG. 7, in order to increase the strength of propping the circuit board 30, another prop portion 16 is disposed on a side that is of the housing structure 101 and that faces the circuit board 30. There are a plurality of prop portions 16 spaced apart on the first housing 1011 and the second housing 1013 separately. The prop portion 16 abuts on the first surface 301 to prop the circuit board 30. The second positioning structure 1003 further includes a prop portion 16, a prop portion 14, and a hold-down portion 17. The hold-down portion 17 is disposed on the outer cover 103. The first surface 301 faces the cell 20. The prop portion 16 and the prop portion 14 abut on the first surface 301. The hold-down portion 17 abuts on the second surface 303 to further increase stability of positioning the circuit board 30 in the first direction Z.

Understandably, in other embodiments, the battery pack 100 may retain just the prop portion 14 or the prop portion 16. In other embodiments, the prop portion 16 may be the prop portion 14 instead.

Understandably, in other embodiments, the second positioning structure 1003 may include merely the first buckle 13 and the prop portion 14, or the second positioning structure 1003 may include merely the prop portion 16 or the prop portion 14 and the hold-down portion 17.

The prop portion 16 is a columnar structure. Specifically, the prop portion 16 is a rectangular column parallel to the third direction Y and formed by radially extending a cylinder toward two sides of the cylinder, so as to increase the prop area and improve the prop stability, but this application is not limited thereto. For example, in another embodiment, there are two prop portions 16 extending along the second direction X and disposed on the first housing 1011 and the second housing 1013 respectively.

Each of the prop portions 16 is provided with a positioning pin 11. The circuit board 30 is further provided with an avoidance hole 37. The avoidance hole 37 corresponds to a positioning pin 11 other than the positioning pin 11 that fits with the positioning hole 36. In addition, the avoidance hole 37 allows the positioning pin 11 to move, so as to avoid a problem of over-positioning. Understandably, in other embodiments, the positioning pin 11 may be directly disposed on the housing structure 101. In another embodiment, the avoidance hole 37 is omissible. Correspondingly, the positioning pin 11 may be disposed merely at a position on the housing structure 101, where the position corresponds to the positioning hole 36.

Referring to FIG. 4, FIG. 6, and FIG. 7 concurrently, the battery pack 100 further includes a second buckle 13*a*. The second buckle 13*a* includes a main body 131 and a second snap-fit portion 133*a*. The main bodies 131 of the first buckle 13 and the second buckle 13*a* are the same structure, but this application is not limited thereto. Understandably, in other embodiments, the first buckle 13 and the second buckle 13*a* may be structures independent of each other and spaced apart on the housing structure 101. The second snap-fit portion 133*a* is disposed on a side that is of the main body 131 and that facing away from the circuit board 30. A second slot 15 is disposed in the outer cover 103. The second snap-fit portion 133*a* is snap-fitted to the second slot 15, so that the outer cover 103 is connected and fixed to the housing structure 101. Understandably, in other embodiments, the second buckle 13*a* is omissible, and the outer cover 103 may be connected and fixed to the housing structure 101 by means of gluing, welding, or the like.

Second Embodiment

Figure 10:
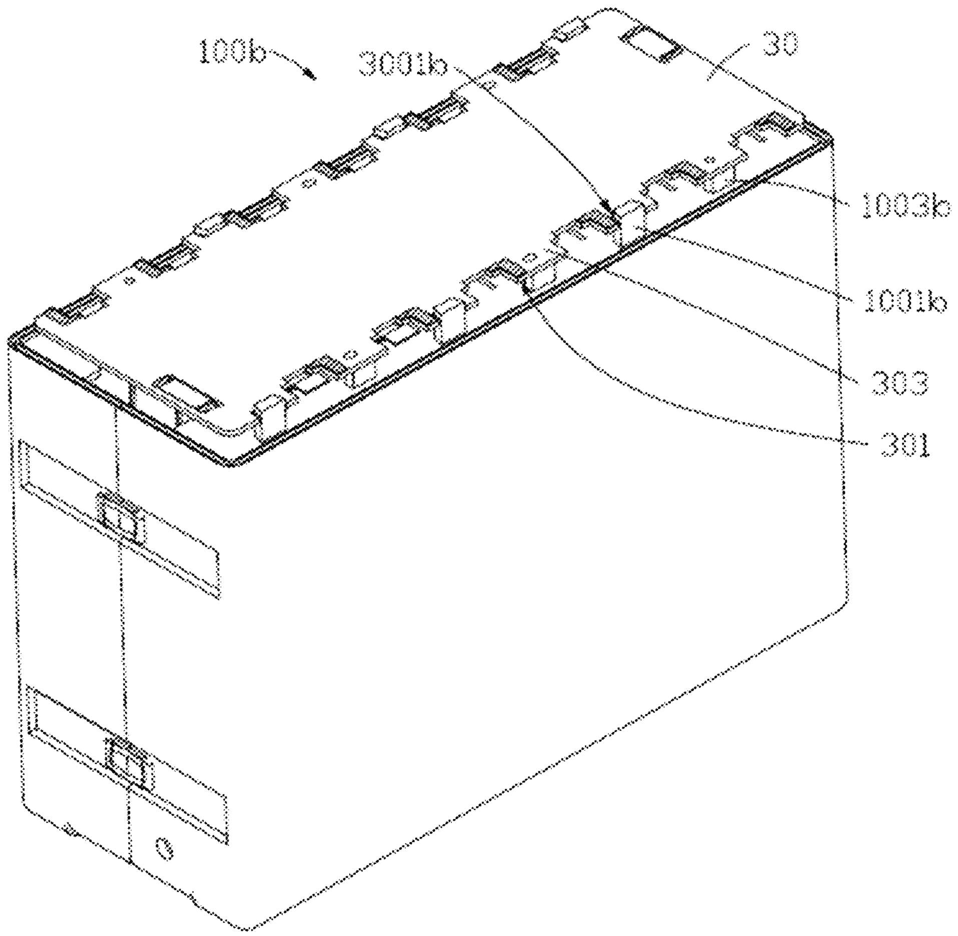
FIG. 10 is a schematic structural diagram of a battery pack without an outer cover according to a second embodiment of this application.
Figure 11:
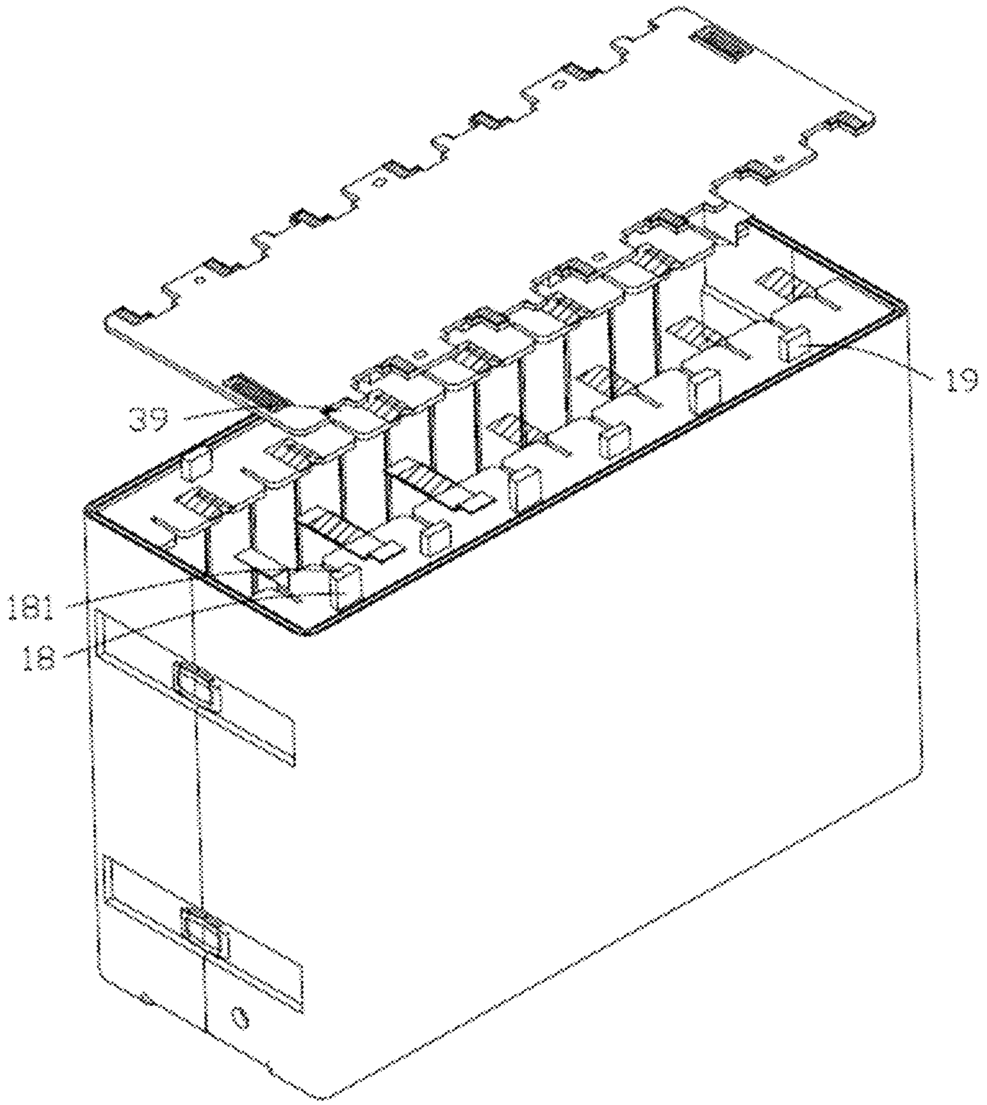
FIG. 11 is a schematic exploded view of a structure of the battery pack shown in FIG. 10 without cells.
Figure 12:
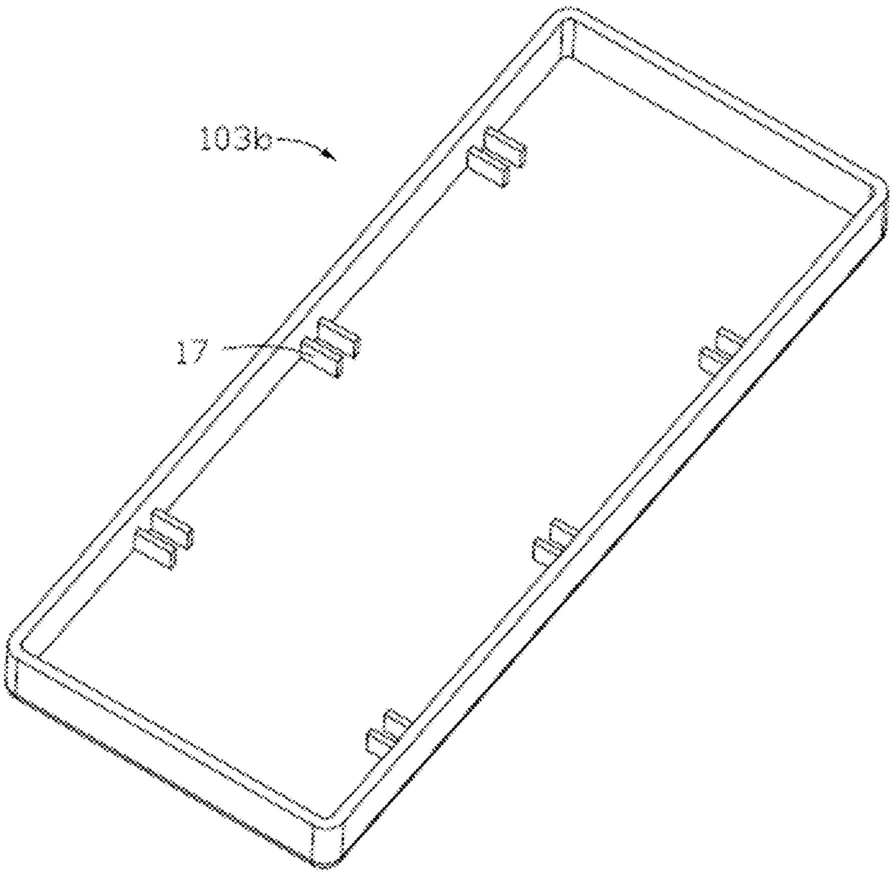
FIG. 12 is a schematic structural diagram of an upper cover of the battery pack shown in FIG. 10.

Referring to FIG. 10, FIG. 11, and FIG. 12 concurrently, a battery pack 100*b* includes a first positioning structure 1001*b*, a second positioning structure 1003*b*, a third positioning structure 3001*b*, and a fourth positioning structure 3003. The structure of the battery pack 100*b* is roughly the same as the structure of the battery pack 100 disclosed in the first embodiment, but differs in: the structure of the first positioning structure 1001*b* is different from the structure of the first positioning structure 1001, and the structure of the second positioning structure 1003*b* is different from the structure of the second positioning structure 1003, and the structure of the third positioning structure 3001*b* is different from the structure of the third positioning structure 3001.

The first positioning structure 1001*b* includes a third buckle 18. The third positioning structure 3001*b* includes a third slot 39. At least two third slots 39 are opened on two sides of the circuit board 30 respectively. The third slot 39 runs through the first surface 301 and the second surface 303. The third buckle 18 is provided with an abutting portion 181 that is contoured to fit the third slot 39. The shape of a cross section that is of the third slot 39 and perpendicular to a first direction Z is roughly a trapezoid, but is not limited to a trapezoid. For example, in other embodiments, the shape of the cross section of the third slot 39 may be an arc-shaped slot formed by connecting three segments of arcs, or the like as long as an opening of the third slot 39 flares out along the third direction Y toward the outer side of the circuit board 30.

The two abutting portions 181 located on two sides of the circuit board 30 are embedded into corresponding third slots 39 respectively. The abutting portions 181 are embedded into the third slots 39 and abut against the walls of the third slots 39 to limit movement of the circuit board 30 in the second direction X and the third direction Y.

The second positioning structure 1003*b* includes a pillar 19 disposed on a housing structure 101 and a hold-down portion 17 disposed on an outer cover 103*b*. The structure of the fourth positioning structure 3003 is the same as the structure of the fourth positioning structure 3003, and includes a first surface 301 and a second surface 303. The pillar 19 abuts on the first surface 301. The hold-down portion 17 abuts on the second surface 303 to position the circuit board 30 in the first direction Z.

Third Embodiment

Figure 13:
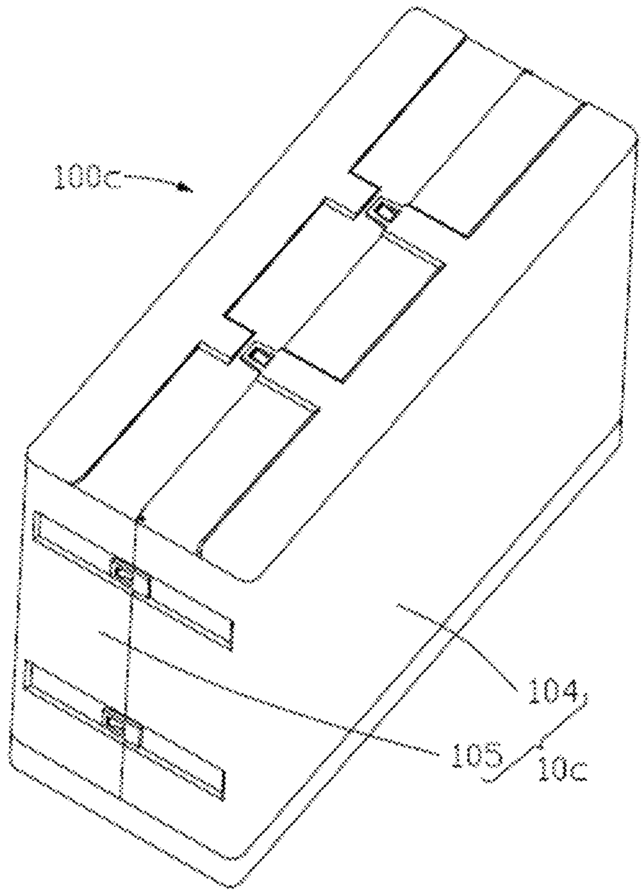
FIG. 13 is a schematic structural diagram of a battery pack according to a third embodiment of this application.

Referring to FIG. 13, the structure of the battery pack 100*c* is roughly the same as the structure of the battery pack 100*b* disclosed in the second embodiment, but differs in: the structure of the shell 10*c* of the battery pack 100*c* is different from the structure of the shell 10 of the battery pack 100*b*.

The shell 10*c* includes a first lateral shell 104 and a second lateral shell 105. The first lateral shell 104 and the second lateral shell 105 move toward each other from two sides of the cell 20 respectively and are connected and fixed in a snap-fit manner.

In the prior art, a copper bar is generally welded to tabs of a plurality of cells to achieve electrical conduction of the plurality of cells. The tabs and the copper bar allow passage of a large current and thereby emit heat. This requires high performance of the copper bar, and increases the manufacturing cost of the copper bar. In addition, a battery pack that adopts a copper bar is generally provided with a transfer circuit board. The transfer circuit board is welded to the copper bar and connected to the circuit board 30 to implement electrical connection between the copper bar, the tabs, and the circuit board 30. A line detection component is disposed on the transfer circuit board, and information such as voltage and temperature of the tabs and the copper bar is collected by using the line detection component. Alternatively, a flexible printed circuit board provided with a collection strip is electrically connected to the copper bar and the circuit board separately, so as to collect the information such as voltage and temperature of the tabs and the copper bar. Another practice in the prior art is to directly connect the flexible printed circuit board to the tabs, so that the flexible printed circuit board directly collects the information such as voltage and temperature of the tabs. In such solutions to collecting tab information, both the transfer circuit board and the flexible printed circuit board increase the manufacturing cost of the battery pack, occupy a relatively large space of the battery pack, and increase the manufacturing steps in a production process.

The foregoing battery packs 100, 100*a*, 100*b*, and 100*c* disclosed in this application implement electrical connection to the tabs of the cells 20 through the first adapter strips 40 and 40*a*, and are electrically connected to the first adapter strips 40 and 40*a* and the circuit board 30 through the second adapter strips 50 and 50*a*, so that the cells 20 are electrically connected to the circuit board 30. The circuit board 30 can directly collect the information such as voltage and temperature of the tabs of each cell 20. The battery packs 100, 100*a*, 100*b*, and 100*c* omit structures such as copper bar, transfer circuit board, and flexible printed circuit board required in the prior art, thereby reducing cost, simplifying the structure, and facilitating installation.

Further, in the battery packs 100, 100*a*, 100*b*, and 100*c*, the first adapter strips 40 and 40*a* and the second adapter strips 50 and 50*a* adopt a simple sheet structure to implement electrical connection between the tabs and the circuit board 30, thereby making full use of the space in the battery packs and improving structural compactness.

Further, the operation of welding between the first adapter strips 40 and 40*a* and the tabs, and the operation of welding between the second adapter strips 50 and 50*a* and the first adapter strips 40 and 40*a*, can be automated, thereby improving the manufacturing efficiency of the battery pack.

Further, the tabs of the cells 20 allow passage of a large current. However, the first adapter strips 40 and 40*a* and the second adapter strips 50 and 50*a* are configured to implement electrical connection between the tabs of each cell 20 and the circuit board 30, and thereby enable the circuit board 30 to collect the information such as voltage and temperature of the tabs. The first adapter strips 40 and 40*a* and the second adapter strips 50 and 50*a* allow passage of no large current, emit little heat, and are structurally simple, thereby relieving the temperature rise in the battery pack.

Further, the circuit board is a circuit board 30 that is provided with a battery management system (BMS, BATTERY MANAGEMENT SYSTEM). The transfer circuit board and the flexible printed circuit board are omitted, thereby reducing space occupation and further improving space utilization.

Further, due to a simplified structure, the battery packs 100, 100*a*, 100*b*, and 100*c* reduce the fault rate and facilitate repair.

The foregoing some embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and conception of the technical solutions of this application.

We claim:

1. A battery pack, comprising at least two cells and a circuit board, wherein each of the at least two cells comprises tabs disposed at one side of the cell, and the battery pack further comprises:

a first adapter strip connecting a positive tab of each cell to a negative tab of an adjacent cell by welding so that two adjacent cells are electrically connected in series; and a second adapter strip welded to the circuit board and connected to the first adapter strip by welding, wherein the circuit board is provided with a first via hole, and a contact interface between the first adapter strip, and the second adapter strip is disposed in the first via hole or under the first via hole.

2. The battery pack according to claim 1, wherein;

the first adapter strip further comprises:

a first fixing portion welded to the tabs of the two adjacent cells, a first bend portion and a first connecting portion connected in tandem, configured to be welded to the second adapter strip, and disposed in the first via hole.

3. The battery pack according to claim 2, wherein the first bend portion is at least partly disposed in the first via hole.

4. The battery pack according to claim 1, wherein;

the second adapter strip comprises a second fixing portion, a second bend portion and a second connecting portion connected in tandem;

the second fixing portion is welded to the circuit board, the second connecting portion is configured to be welded to the first adapter strip, and the second connecting portion is disposed in the first via hole.

5. The battery pack according to claim 4, wherein the second bend portion is at least partly disposed in the first via hole.

6. The battery pack according to claim 4, wherein;

the circuit board comprises a first surface and a second surface opposite to the first surface, and the second fixing portion is disposed on the second surface.

7. The battery pack according to claim 2, wherein the circuit board is provided with a second via hole, the second via hole communicates with the first via hole, and the first fixing portion is at least partly exposed in the second via hole.

8. The battery pack according to claim 1, wherein the circuit board is provided with a third via hole, the battery pack further comprises a third adapter strip, the third adapter strip is disposed on a side of circuit board and facing away from the cell, and a positive tab or a negative tab of an outside cell passes through the third via hole and is connected to the third adapter strip.

9. The battery pack according to claim 8, wherein the circuit board is provided with a fourth via hole, and the fourth via hole partly overlaps a projection of the third adapter strip on the circuit board.

10. The battery pack according to claim 1, wherein:

the circuit board comprises a first surface and a second surface opposite to the first surface, the first surface faces the cell, and a contact interface between the first adapter strip and the second adapter strip is disposed outside the first via hole.

11. The battery pack according to claim 10, wherein the second adapter strip is disposed on the first surface.

12. The battery pack according to claim 10, wherein;

the second adapter strip is disposed on the second surface;

the first adapter strip comprises a first fixing portion, a first bend portion and a first connecting portion are connected in tandem;

the first fixing portion is welded to the tabs of the two adjacent cells, the first connecting portion is configured to be welded to the second adapter strip, and the first bend portion is at least partly disposed in the first via hole.

13. The battery pack according to claim 1, wherein the circuit board is a circuit board provided with a battery management system.

14. The battery pack according to claim 1, wherein first current collecting plates and second current collecting plates are configured to implement electrical connection between the tabs of each adjacent cell and the circuit board.

15. The battery pack according to claim 1, further comprising:

a shell, wherein the shell comprises a housing structure and an outer cover disposed on one side of the housing structure.

16. The battery pack according to claim 15, wherein;

the battery pack comprises a plurality of positioning pins disposed on the housing structure and a plurality of positioning holes disposed on the circuit board, and the plurality of positioning pins is inserted into the plurality of positioning holes.

17. The battery pack according to claim 1, wherein the first adapter strip and the second adapter strip are laser-welded.

18. The battery pack according to claim 4, wherein the circuit board is disposed between the tabs and the second fixing portion.

19. The battery pack of claim 1, wherein a part of the first adapter strip and a part of the second adapter strip are exposed in the first via hole.

20. The battery pack of claim 19, wherein a projection of the part of the first adapter strip and a projection of the part of the second adapter strip partly overlap along a direction parallel to a direction in which the tabs extend from the two adjacent cells.

* * * * *